Dec. 14, 1948.   R. M. NARDONE   2,456,211
FLUID PRESSURE SERVOMOTOR
Original Filed Oct. 22, 1940   2 Sheets-Sheet 1
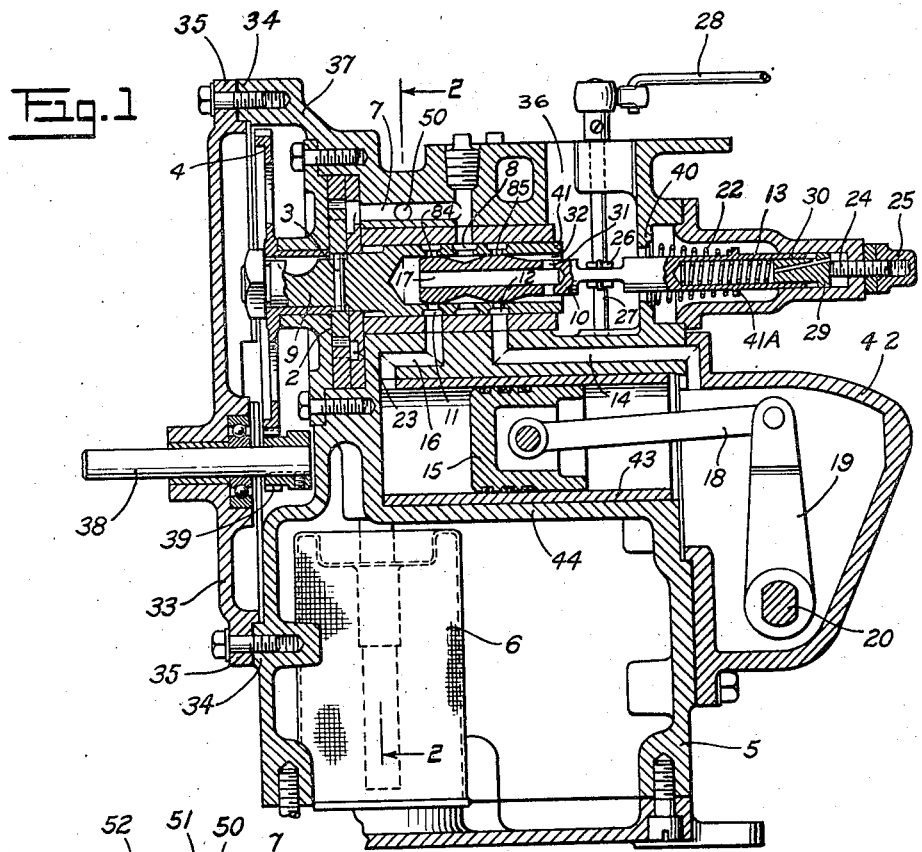
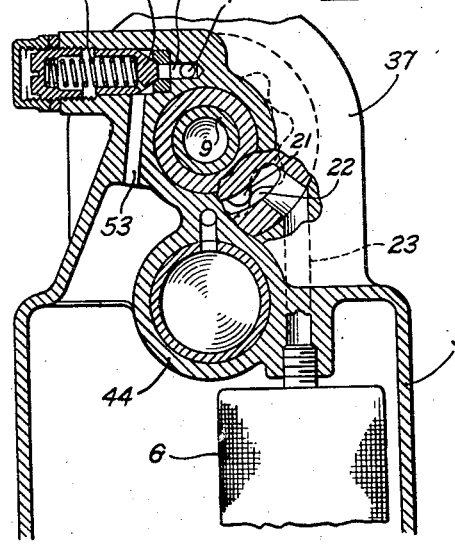
INVENTOR.
Romeo M. Nardone
BY Martin J. Finnegan
ATTORNEY.

Dec. 14, 1948.    R. M. NARDONE    2,456,211
FLUID PRESSURE SERVOMOTOR

Original Filed Oct. 22, 1940    2 Sheets-Sheet 2

INVENTOR.
Romeo M Nardone
BY Martin J. Finnegan
ATTORNEY.

Patented Dec. 14, 1948

2,456,211

UNITED STATES PATENT OFFICE 2,456,211

FLUID PRESSURE SERVOMOTOR

Romeo M. Nardone, Teaneck, N. J., assignor to Bendix Aviation Corporation, Teterboro, N. J., a corporation of Delaware Original application October 22, 1940, Serial No. 362,271. Divided and this application August 10, 1943, Serial No. 498,123

2 Claims. (Cl. 121—38)

This invention relates to fluid pressure systems, and particularly to the structure and operation of a servo-element forming part of a fluid pressure system, and operable in response to fluid pressure to control the degree of movement of a part or parts to be actuated.

An object of the invention is to provide a servo-motor with a valve of the plunger type, shiftable in either direction along the line of its longitudinal axis, and cooperating with a second valve element rotatable about said longitudinal axis, whereby longitudinal shifting of the plunger is facilitated; the constant rotation of the cooperating valve element being effective to offset any slight deviation from true alignment, or any eccentricity of bearings or other parts, which misalignment or eccentricity would otherwise cause binding or jerky operation.

Another object is to provide a novel "follow-up" mechanism, involving a third valve element cooperating with the other two in such manner as to produce automatic cessation of fluid flow to and from the servo-motor, at the instant when the part to be moved has reached the intended setting.

Other objects and features of the invention will become apparent from inspection of the following specification when read with reference to the accompanying drawings wherein are illustrated the preferred embodiments of the invention. It is to be understood, however, that the drawings are for the purpose of illustration only, and are not designed as a definition of the limits of the invention, reference being had to the appended claims for this purpose.

In the drawings:

Fig. 1 is a longitudinal sectional view of a device embodying certain features of the invention;

Fig. 2 is a transverse sectional view along the line 2—2 of Fig. 1;

Figure 3:
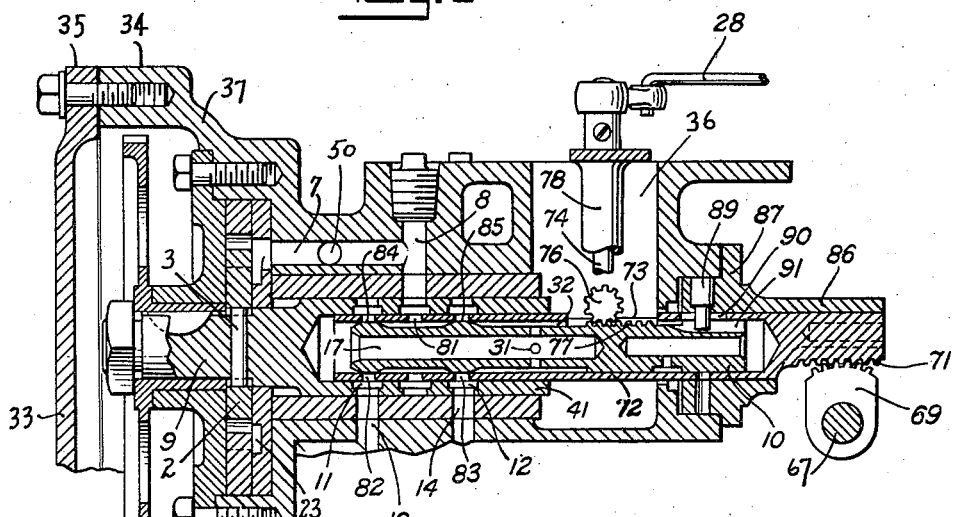
Fig. 3 is a longitudinal sectional view of a device embodying all features of the invention.

The invention is shown as embodied in a sectional casting whose lower section 5, constituting an oil reservoir, includes the lower part of a ledge 34 adapted to receive the flange 35 of an end-plate 33 cooperating with the upper section 37 of the unit to form a housing for a gear 4 which constitutes part of the driving connections between driving shaft 38, pinion 39, and pump rotor 2, the latter being mounted on the gear driven shaft 9 and rotatable therewith by virtue of the pin connection 3. Extended end 41 of shaft 9 is bored to form a chamber in which plunger valve 10 reciprocates and thereby controls flow of oil, or other fluid, through the circumferential and radial ports 8, 11 and 12 in the sleeve-like end 41 of the rotating shaft 9. This sleeve 41 constitutes the second valve element above referred to as cooperating with plunger valve 10 to govern the operation of the servo-element 15. As shown, servo-element 15 is in the form of a piston reciprocable in a cylinder 43 mounted in a pocket 44 of the housing, and serving to actuate a work performing shaft 20 by reason of the intervening connecting rod 18 and crank-arm 19. The pump 2 may be of the "Gerotor" type having inner and outer rotors with inter-meshing teeth 21, 22 (Fig. 2) as more fully disclosed in the Hill patents, such as Patent No. 1,682,564.

The pump 2 draws oil from reservoir 5 through a strainer 6 and inlet passage 23, and delivers it under pressure to outlet passage 7 and valve port 8. With the plunger valve 10 in the central (neutral) position, ports 11 and 12 of the sleeve valve are covered, hence the only escape path for the pumped oil is by way of transverse passage 50 to valve 51 (Fig. 2) which—when the pressure becomes sufficiently high—is pushed off its seat by the pressure acting thereupon, overcoming the opposition of spring 52. The oil which passes valve 51 returns to the reservoir 5 by way of return duct 53.

When plunger valve 10 moves to the right, oil flows from port 8 through ports 12 and 14 to the right of piston 15, moving the said piston to the left as the oil on the left thereof returns to the reservoir by way of passages 16, 11, 17, 31 and 32, the passage 17 extending centrally of the valve, as far as radial port 31, which passes to a space 36 communicating with the reservoir 5. When plunger valve 10 moves to the left, the port 12 is exposed to the space 36, and the oil flow is the reverse of that first indicated.

It will be noted that the crank-arm housing 42 cooperates with cylinder 43 to form the complete fluid chamber on the right of piston 15; the only means of egress therefrom being by port 14. The housing 42 is fluid-tight at all points, including the space around shaft 20. (See Fig. 4.)

Plunger 10 is balanced and retained in its neutral position by opposing springs 22 and 13 which may be adjusted, as by a screw 24 and a thumb nut 25. The screw 24 operates upon a shiftable spring abutment in the form of a flanged plug 29 which is telescopically received within the outer extension 30 of the valve member 10. Movement of the screw therefore varies the deflection of spring 13 and hence effects a balancing of the valve member 10, in conjunction with pre-set spring 22. The latter spring abuts the stationary support 40 at one end, while its opposite end abuts flange 41A of valve extension 30. Thus it opposes, and is balanced by, spring 13.

The central portion of the plunger 10 is flattened for the attachment of arm 26 which is in turn secured to rock shaft 27. To this rock shaft is connected a control member on link 28 movable by hand or by any part movable to control the shifting of the valve member 10, and thereby control the action of the servo-motor 15. By this means the movement of the shaft 20 may be controlled from a remote point.

It will be seen that pump 2 serves a twofold purpose. First, it is the source of fluid pressure for operation of the servo-piston 15 and secondly, its action in constantly rotating the outer portion 41 of the valve is such as to facilitate reciprocation of the inner portion 10 of said valve; the constant rotation of the outer part 41 being effective to offset any slight deviation from true alignment, or any eccentricity of bearings on other parts, any of which irregularities would otherwise interfere with smooth and facile operation of the reciprocable inner portion of the valve.

Figure 4:
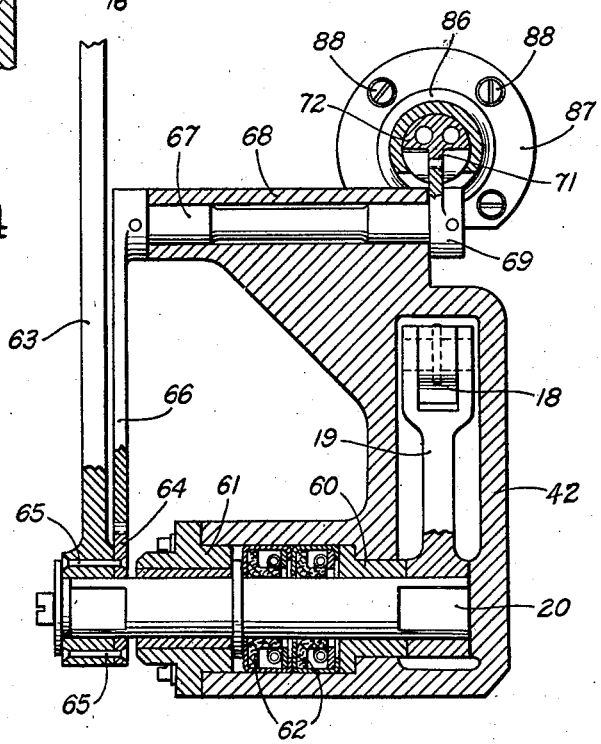
Fig. 4 is a transverse sectional view of that portion of the device of Fig. 3 which is not fully illustrated in said Fig. 3.

Another feature, which is not illustrated in Figs. 1 and 2, but as shown in Figs. 3 and 4 in the manner in which it may be most readily applied to the above described mechanism of Figs. 1 and 2, is the "follow-up" mechanism by which the valve is automatically restored to the neutral or cut-off position, as soon as the operated shaft 20 reaches the position corresponding to the degree of movement of the actuating part 28. As shown in Figs. 3 and 4 this "follow-up" mechanism is operatively connected with the operated shaft 20, the connection being preferably at the end of said shaft which is remote from the housing 42 in which said shaft 20 is adapted to oscillate in response to the movements of the actuating piston 15; the movement of the shaft 20 being facilitated by the provision of friction reducing bearings 60 and 61, and the escape of fluid from the housing 42 being guarded against by the provision of the sealing means 62 which is interposed between the bearings 60 and 61. The operative connection between shaft 20 and the "follow-up" mechanism preferably takes the form of a pinion 64 secured to the lever 63 by suitable means 65 and having a sufficient number of teeth to remain at all times in meshing relation to a correspondingly toothed sector 66 whose apertured upper end receives rock shaft 67 to which it imparts movement, the said rock shaft having its bearings in a transversely extending bore in the upper portion 68 of the housing 42 and protruding therefrom to receive the apertured circular end of a toothed sector 69 which meshes with a rocking element 71 which, as shown, is integral with a long tubular valve element 72 having ports 81, 82 and 83 whose spacing corresponds to the spacing of the ports 8, 11 and 12 of the associated valve structure shown in Figs. 1 and 2 and reproduced in Fig. 3. Throughout the range of movement of the parts, these ports 81, 82 and 83 remain in registry with the ports 8, 11 and 12, respectively, of the valve element 41, but when slidable valve element 10 is in the neutral or cut-off position, the port 8—81 is cut off from both the port 11—82 and the port 12—83 by the blocking action of lands 84 and 85 as they cover ports 82 and 83, respectively; therefore no flow of fluid to either side of the piston 15 can occur in such neutral position of the shiftable element 10.

The mechanism for shifting the element 10 is substantially the same as heretofore described and illustrated in Fig. 1, except that the means for translating the shifting of arm 28 into a corresponding shifting of the slidable valve element 10 takes the form of a pinion 76 and corresponding aligned teeth 77 cut along the surface of a portion of the shiftable valve element 10 adjacent the longitudinally extending slot 73 cut in the surface of the "follow-up" element 72, wherefore movement of the said element 72 between its limits of travel is possible without interference with the actuating pinion 76 which causes a shifting of the valve element 10 in response to a rocking of the actuating shaft 74 corresponding to the actuating shaft 27 of Fig. 1. To facilitate illustration of this feature of the invention, the pinion 76 and the rack 77 are shown in Fig. 3 as being shifted ninety degrees from their actual locations, but it is to be understood that pinion 76 is integrated with shaft 74 and turns with said shaft about a common axis. Shaft 74 is journaled in a bearing 78 secured to the frame or housing and is movable through any desired portion of its arc of movement under the control of the actuating member 28. The "follow-up" element 71—72 is held against rotation, as is also the shiftable valve element 10, by the restraining pin 89 which is mounted in the extending bearing portion 86 of an end-plate 87 which registers with a boss on the housing, the said pin 89 being adapted to extend into slots 90 and 91 formed in the elements 72 and 10, respectively, and thus preventing rotation of either element while permitting longitudinal movements thereof in response to rotation of the toothed driving elements 69 and 76, respectively. With this construction it will be apparent that movement of operating shaft 74 through any desired angle, say ten degrees, produces a corresponding rectilinear movement of the valve element 10 within the valve element 72 and the rotating valve element 41 of Figs. 1 and 3. If this movement is such as to produce clockwise rotation of the pinion 76 as viewed in Fig. 3, the resulting leftward shifting of element 10 will withdraw lands 84 and 85 from covering relation to ports 82 and 83, and will serve to establish communication between the supply port 8 and the ports 11 and 82 leading to the left-hand side of the piston 15. The result will be a corresponding rotation of the shaft 20 and the lever 63 operatively connected thereto to a corresponding arc of say ten degrees. There will simultaneously occur a rocking of the shaft 67 through a similar arc, and a resulting shift of the "follow-up" valve element 72, to carry ports 82 and 83 toward the new position of lands 84 and 85, respectively. When such "follow-up" is completed, communication between the port 8, on the one hand, and the port 11—82 on the other, will again be cut off, as will also communication between port 12—83, on the one hand, and annular outlet 32 on the other. When this occurs, and it will occur simultaneously with the arrival of the operated lever 63 at a position corresponding to the amount of shifting of the operating member 28, all flow of fluid to and from the chambers of piston 15 will cease, and resulting equilibrium will prevent further movement of the piston 15. Thus the desired setting of the operated member 63 is brought about in response to the initial operation of the actuating member 28 and without any further manual supervision or intervention.

It will be obvious from the foregoing that the member 63 to be operated may be shifted in the opposite direction in response to an opposite shifting of the actuated member 28, as the valve mechanism will on such occasions operate first to establish communication between the supply passage 8—81, on the one hand, and the passage 14 on the other, while connecting the passage 16 with the reservoir 5 by way of the longitudinally extending passage 17, port 31, and annular outlet 32; and as the actuated member 63 moves toward the desired setting, the "follow-up" valve 72 will move toward the cut-off position to terminate the flow from the supply passage 8 at the moment of completion of the shift of the operated member 63.

This application is a division of my previous application No. 362,271, filed October 22, 1940, now abandoned.

What is claimed is:

1. The combination, with a servo-motor, of valve mechanism for controlling fluid flow therein, said mechanism including a pair of relatively movable nested valve elements, the inner of which elements is reciprocable and the outer of which elements is rotatable and provided with a plurality of ports communicable with each other in a predetermined paired relation, means carried by said inner element for establishing said paired relation, said inner element having an outward extension, resilient means mounted on said extension, for yieldably holding the inner element in a position with respect to said ports, to render said first-mentioned means ineffective, means for adjusting said resilient means to insure holding said inner element in said position, and means for shifting said inner element in either direction from said position to render said first-mentioned means effective.

2. The combination, with a servo-motor, of valve mechanism for controlling fluid flow therein, said mechanism including a pair of relatively movable nested valve elements, the inner of which elements is reciprocable and the outer of which elements is rotatable and provided with a plurality of ports communicable with each other in a predetermined paired relation, means carried by said inner element for establishing said paired relation, said inner element having an outward extension, resilient means mounted on said extension, including cooperating oppositely acting springs for yieldably holding the inner element in a position with respect to said ports, to render said first-mentioned means ineffective, means for adjusting one of said springs to insure holding said inner element in said position, and means for shifting said inner element in either direction from said position to render said first-mentioned means effective.

ROMEO M. NARDONE.

REFERENCES CITED

The following references are of record in the file of this patent:

UNITED STATES PATENTS

| Number | Name | Date |
|---|---|---|
| 533,143 | Schmaltz | Jan. 29, 1895 |
| 1,600,542 | Gagg | Sept. 21, 1926 |
| 1,972,852 | Albright | Sept. 11, 1934 |
| 2,047,922 | Seligmann | July 14, 1936 |
| 2,117,891 | Kalin | May 17, 1938 |
| 2,139,878 | Carlson | Dec. 13, 1938 |
| 2,204,640 | Woodward | June 18, 1940 |
| 2,223,136 | Tweddell | Nov. 26, 1940 |
| 2,258,094 | Keller | Oct. 7, 1941 |
| 2,270,059 | Kahr | Jan. 13, 1942 |